United States Patent
Calis et al.

(10) Patent No.: US 11,971,243 B2
(45) Date of Patent: Apr. 30, 2024

(54) BALLISTIC-RESISTANT ARTICLE BASED ON FILMS PROVIDED WITH MATRIX

(71) Applicant: TEIJIN ARAMID B.V., Arnhem (NL)

(72) Inventors: Ruben Calis, Pannerden (NL); Dennis Wilbers, Arnhem (NL)

(73) Assignee: TEIJIN ARAMID B.V., Arnhem (NL)

( * ) Notice: Subject to any disclaimer, the term of this patent is extended or adjusted under 35 U.S.C. 154(b) by 305 days.

(21) Appl. No.: 17/425,167

(22) PCT Filed: Jan. 24, 2020

(86) PCT No.: PCT/EP2020/051711
§ 371 (c)(1),
(2) Date: Jul. 22, 2021

(87) PCT Pub. No.: WO2020/152309
PCT Pub. Date: Jul. 30, 2020

(65) Prior Publication Data
US 2022/0090881 A1  Mar. 24, 2022

(30) Foreign Application Priority Data

Jan. 24, 2019 (EP) .................................. 19153440

(51) Int. Cl.
| | | |
|---|---|---|
| *F41H 5/04* | (2006.01) | |
| *B29C 55/00* | (2006.01) | |
| *B29C 55/02* | (2006.01) | |
| *B32B 27/08* | (2006.01) | |
| *B32B 27/32* | (2006.01) | |
| *B32B 37/18* | (2006.01) | |
| *B32B 38/00* | (2006.01) | |
| *B29K 23/00* | (2006.01) | |
| *B29L 9/00* | (2006.01) | |

(52) U.S. Cl.
CPC ............ *F41H 5/04* (2013.01); *B29C 55/005* (2013.01); *B29C 55/023* (2013.01); *B32B 27/08* (2013.01); *B32B 27/32* (2013.01); *B32B 37/182* (2013.01); *B32B 38/0012* (2013.01); *B29K 2023/0683* (2013.01); *B29L 2009/00* (2013.01); *B32B 2038/0028* (2013.01); *B32B 2307/558* (2013.01); *B32B 2571/02* (2013.01)

(58) Field of Classification Search
CPC ........ F41H 5/04; F41H 5/0471; F41H 5/0478; F41H 5/0485; B29C 55/005; B29C 55/023; B29K 2023/0683; B29L 2009/00; B32B 27/08; B32B 27/32; B32B 37/182; B32B 38/0012; B32B 2038/0028; B32B 2307/558; B32B 2571/02
USPC ...................................................... 89/36.02
See application file for complete search history.

(56) References Cited

U.S. PATENT DOCUMENTS

| | | | | |
|---|---|---|---|---|
| 5,702,657 A | * | 12/1997 | Yoshida .................... | D01F 1/10 264/211 |
| 2006/0210749 A1 | * | 9/2006 | Geva ......................... | B32B 5/12 428/36.1 |
| 2009/0297816 A1 | * | 12/2009 | Arvidson ............... | B32B 27/322 428/221 |
| 2009/0311466 A1 | * | 12/2009 | Marissen .............. | F41H 5/0485 156/308.2 |
| 2010/0279060 A1 | * | 11/2010 | Pilpel ...................... | B32B 37/12 428/113 |
| 2011/0020593 A1 | * | 1/2011 | Winkler ................ | F41H 5/0485 156/60 |
| 2014/0072758 A1 | * | 3/2014 | Arvidson ............... | D04H 3/009 428/221 |
| 2014/0273696 A1 | * | 9/2014 | Tam ........................ | B32B 5/024 28/165 |
| 2016/0159034 A1 | * | 6/2016 | Bhatnagar ............. | B32B 27/365 428/212 |
| 2017/0010071 A1 | * | 1/2017 | Van Der Eem ....... | F41H 5/0485 |
| 2018/0022060 A1 | * | 1/2018 | Downs ..................... | F41H 1/02 89/36.02 |
| 2018/0375203 A1 | * | 12/2018 | Petra ....................... | H01Q 1/427 |

(Continued)

FOREIGN PATENT DOCUMENTS

| | | |
|---|---|---|
| EP | 0 721 021 A2 | 7/1996 |
| EP | 1 627 719 A1 | 2/2006 |
| WO | 1998/043812 A1 | 10/1998 |

(Continued)

OTHER PUBLICATIONS

Mar. 2, 2020 International Search Report issued in International Patent Application No. PCT/EP2020/051711.

*Primary Examiner* — Joshua E Freeman
*Assistant Examiner* — Benjamin S Gomberg
(74) *Attorney, Agent, or Firm* — Oliff PLC

(57) ABSTRACT

A process for manufacturing a ballistic resistant article including steps: a) stacking a stretchable lamina of ultra-high molecular weight polyethylene (UHMWPE) and a stretchable continuous film of a polymer as organic matrix material to form a lamina-film stack, the continuous film not being an UHMWPE film; b) elongating the stack at a temperature below the melting point of the lamina, to an elongation ratio of at least 2, thereby providing a UHMWPE film with an organic matrix material in which the UHMWPE film is co-stretched with the film of polymer as organic matrix material; c) aligning a plurality of films to form a layer of films; d) stacking at least two layers of films to form a sheet; e) stacking a plurality of sheets to form a stack of sheets, and consolidating the sheets prior to and/or after step e) by applying pressure and optionally heat. Also, a ballistic-resistant article.

15 Claims, No Drawings

(56) References Cited

U.S. PATENT DOCUMENTS

2019/0128648 A1* 5/2019 Bhatnagar ............. B32B 27/308

FOREIGN PATENT DOCUMENTS

| WO | 2007/122009 A1 | 11/2007 |
| WO | 2009/109632 A1 | 9/2009 |

* cited by examiner

BALLISTIC-RESISTANT ARTICLE BASED ON FILMS PROVIDED WITH MATRIX

The present invention pertains to a ballistic-resistant article comprising films provided with an organic matrix material and to processes of manufacture thereof.

Ballistic-resistant articles comprising films are known in the art.

EP 1 627 719 describes a ballistic-resistant article consisting essentially of ultra-high molecular weight polyethylene which comprises a plurality of unidirectionally oriented polyethylene sheets cross-plied at an angle with respect to each other and attached to each other in the absence of any resin, bonding matrix, or the like.

WO 2009/109632 describes a ballistic-resistant moulded article comprising a compressed stack of sheets comprising tapes and an organic matrix material, the direction of the tapes within the compressed stack being not unidirectionally, with the stack comprising 0.2-8 wt. % of an organic matrix material. The matrix material may be provided in liquid form or in the form of a film. However, the low amount of matrix material used makes the use of a film less preferred.

While the references mentioned above describe ballistic-resistant articles with adequate properties, there is still room for improvement.

In particular, when using UHMWPE films the presence of a matrix is crucial to allow the films to adhere to each other during handling and use. However, a too high amount of matrix may negatively impact ballistic performance of the ballistic-resistant article. It is therefore important to minimize the amount of matrix. One way to minimize the matrix material has been described to apply a matrix material discontinuously, only to discrete areas of the surface of the films. For instance, WO 2009/109632 describes applying the matrix material in the form of a web, wherein a web is a discontinuous polymer film, that is, a polymer film with holes, because it allows the provision of low weights of matrix material.

However, discontinuous application of a matrix material results in film areas with different adhesion properties. Further, having a non-uniform matrix distribution over the surface of the films may result in low wear resistance, as UHMWPE films tend to form fibrils upon handling and during use in areas free of matrix material, which is undesirable from aesthetic and performance points of view.

Thus, there is need for ballistic-resistant articles comprising films with low amounts of matrix with good adhesion and wear resistance properties and which combine a high ballistic performance with a low areal weight and a good stability. The present invention provides such an article.

In one embodiment, the present invention pertains to a ballistic-resistant article comprising a stack of sheets, the sheets comprising at least two layers of ultra-high molecular weight polyethylene (UHMWPE) films provided with an organic matrix material, the continuous film of a polymer as organic matrix material not being an UHMWPE film, wherein the UHMWPE films are provided over at least 95% of at least one of their surfaces with a continuous film of a polymer as organic matrix material, wherein the UHMWPE films have a thickness of 10-100 microns and the organic matrix polymer film has a thickness of 0.1-3 microns, wherein the weight percentage of the organic matrix polymer with respect to the total weight of organic matrix polymer and ultra-high molecular weight polyethylene is from 0.1 to 3 wt. %, and wherein the sheets in the stack are consolidated, wherein the orientation of the polymer molecules in the continuous film of a polymer as organic matrix material in a first direction of the film differs from the orientation of the polymer molecules in the continuous film of a polymer in a second direction of the film, wherein the first direction of the film and the second direction of the film are at an angle of 90° C.

The present invention therefore pertains to a ballistic-resistant article, such as a hard-ballistic article or a soft-ballistic article, comprising a stack of sheets, the sheets comprising at least two layers of ultra-high molecular weight polyethylene (UHMWPE) films provided with an organic matrix material, and wherein the sheets in the stack are consolidated.

The UHMWPE films are provided over at least 95% of at least one of their surfaces with a continuous film of a polymer as organic matrix material. The matrix polymer is not UHMWPE.

Further, the UHMWPE films have a thickness of 10-100 microns and the organic matrix polymer film has a thickness of 0.1-3 microns. Furthermore, the weight percentage of the organic matrix polymer with respect to the total weight of organic matrix polymer and ultra-high molecular weight polyethylene is from 0.1 to 3 wt. %.

In a ballistic-resistant article of the present invention a large area of at least one of the surfaces of the UHMWPE films is covered with a continuous thin layer of organic matrix material. This allows the use of very low amounts of organic matrix material while still providing good adherence of the UHMWPE films and protecting the UHMWPE films against fibrillation, improving the wear resistance of the ballistic-resistant article, e.g. during its preparation, handling or use.

The orientation of the polymer molecules in the continuous film of a polymer as organic matrix material in a first direction of the film differs from the orientation of the polymer molecules in the continuous film of a polymer in a second direction of the film, wherein the first direction of the film and the second direction of the film are at an angle of 90° C. The orientation of the polymer in the organic matrix material can, e.g., be determined via polarised FT-IR, by means of the dichroic ratio. The dichroic ratio is the ratio between the absorbances measured with radiation polarized in a first direction (e.g. the draw direction of a film) and radiation polarised in a second direction perpendicular to the first direction. The wavelength at which the ratio is determined is different for different polymers. For a polyethylene matrix material 720 and 730 nm may, e.g., be used. It the case of using a polyethylene matrix, the measurement should be constructed in such a way that only the polyethylene matrix is measured, and not the UHMWPE film. This may be achieved using techniques known to the person skilled in the art, e.g., by measuring in ATR mode using a Ge crystal. The difference in polymer orientation is generally caused by the manufacturing method of the film, with the first direction being the draw direction of the film and the second direction being the direction perpendicular to the draw direction. The effect is particularly pronounced when the ballistic-resistant article is manufactured by the method according to the invention, where the matrix film is obtained in a process in which it is co-stretched with the UHMWPE film.

Furthermore, ballistic-resistant articles as described herein have good ballistic performance. Their ballistic performance may even be improved with respect to similar ballistic resistant articles based on UHMWPE films with higher amounts of matrix. Also, the article according to the invention requires a lower weight than an article with higher amounts of matrix in order to achieve the same ballistic performance, advantageously allowing to produce lighter ballistic-resistant articles.

The instant invention also pertains to a process for manufacturing a ballistic-resistant article. In particular, the process for the manufacture of a ballistic-resistant article comprises the steps of a) stacking a stretchable lamina of ultra-high molecular weight polyethylene (UHMWPE) and a stretchable continuous film of a polymer as organic matrix material to form a lamina-film stack, the continuous film of a polymer as organic matrix material not being an UHMWPE film, b) elongating the lamina-film stack formed in step a) at a temperature below the melting point of the stretchable UHMWPE lamina, to an elongation ratio of at least 2, thereby providing a UHMWPE film with an organic matrix material having the UHMWPE film co-stretched with the film of polymer as organic matrix material, c) aligning a plurality of films provided according to step b) to form a layer of films, d) stacking at least two layers of films formed according to step c) to form a sheet, e) stacking a plurality of sheets formed according to step d) to form a stack of sheets, and f) consolidating the sheets prior to and/or after stacking according to step e) by applying pressure and optionally heat.

Accordingly, in a ballistic resistant article and in a process as described herein, the UHMWPE film is co-stretched with the film of polymer as organic matrix material.

The processing step of elongating the lamina-film stack to provide the UHMWPE film co-stretched with the organic matrix polymer film, allows for obtaining a low amount and low thickness of organic matrix material in combination with a high and continuous coverage of the UHMWPE films with the organic matrix material.

EP 0 721 021 describes a method to add functionality to a polyethylene material. In particular, this document describes a method for the continuous production of a polyethylene material by rolling an ultra-high-molecular-weight polyethylene film or film like material and then drawing the rolled material, wherein a thermoplastic resin film having incorporated therein at least one additive selected from a coloring agent, a weathering stabilizer, an antistatic agent, a hydrophilicity-imparting agent, an adhesion promoter and a dyeability-imparting agent is laminated to the film material in the rolling step. This method makes it easy to color the polyethylene material having high strength and high modulus of elasticity and to impart weather resistance and other desirable properties thereto. However, this document does not describe or suggest such materials for use in ballistic-resistant articles. Also this document does not describe articles with a low organic matrix content together with good adhesion and wear resistance properties.

DETAILED DESCRIPTION OF THE INVENTION

A ballistic-resistant article as described herein comprises a stack of sheets, the sheets comprising at least two layers of UHMWPE films provided with an organic matrix material.

In the context of the present specification the term film means an object of which the length, i.e. the largest dimension of the object, is larger than the width, i.e. the second smallest dimension of the object, and the thickness, i.e. the smallest dimension of the object, while the width is in turn larger than the thickness. For the purposes of the present specification the UHMWPE film is regarded to have two film surfaces, i.e. the top and bottom planes defined by the length and width dimensions of the film.

The ratio between the length and the width of a film generally is at least 10:1 Depending on the film width the ratio may be larger, e.g., at least 100:1, or at least 1000:1. The maximum ratio is not critical to the present invention. As a general value, a maximum length to width ratio of 1 000 000:1 may be mentioned.

The ratio between the width and the thickness generally is more than 10:1, in particular more than 50:1, still more in particular more than 100:1. The maximum ratio between the width and the thickness is not critical to the present invention. It generally is at most 10000:1.

The ultra-high molecular weight polyethylene (UHMWPE) of a film as described herein has a weight average molecular weight (Mw) of at least 300 000 gram/mole, in particular of at least 500 000 gram/mole, more in particular from $1\times10^6$ gram/mole to $1\times10^8$ gram/mole.

The weight average molecular weight (Mw) may be determined in accordance with ASTM D 6474-99 at a temperature of 160° C. using 1, 2, 4-trichlorobenzene (TCB) as solvent. Appropriate chromatographic equipment (e.g. PL-GPC220 from Polymer Laboratories) including a high temperature sample preparation device (e.g. PL-SP260) may be used. The system is calibrated using sixteen polystyrene standards (Mw/Mn<1.1) in the molecular weight range $5\times10^3$ to $8\times10^6$ g/mole.

The molecular weight distribution may also be determined using melt rheometry. Prior to measurement, a polyethylene sample to which 0.5 wt % of an antioxidant, such as IRGANOX 1010, has been added to prevent thermo-oxidative degradation, is first sintered at 50° C. and 200 bars. Disks of 8 mm diameter and thickness of 1 mm obtained from the sintered polyethylenes are heated fast (at about 30° C./min) to well above the equilibrium melting temperature in the rheometer under nitrogen atmosphere. For example, the disk may be kept at 180° C. for two hours or more. The slippage between the sample and rheometer discs may be checked with the help of an oscilloscope. During dynamic experiments two output signals from the rheometer i.e. one signal corresponding to sinusoidal strain, and the other signal to the resulting stress response, are monitored continuously by an oscilloscope. A perfect sinusoidal stress response, which can be achieved at low values of strain is indicative of no slippage between the sample and discs.

Rheometry may be carried out using a plate-plate rheometer such as Rheometrics RMS 800 from TA Instruments. The Orchestrator Software provided by the TA Instruments, which makes use of the Mead algorithm, may be used to determine molar mass and molar mass distribution from the modulus vs frequency data determined for the polymer melt. The data is obtained under isothermal conditions between 160-220° C. To get the good fit angular frequency region between 0.001 to 100 rad/s and constant strain in the linear viscoelastic region between 0.5 to 2% should be chosen. The time-temperature superposition is applied at a reference temperature of 190° C. To determine the modulus below 0.001 frequency (rad/s) stress relaxation experiments may be performed. In the stress relaxation experiments, a single transient deformation (step strain) to the polymer melt at fixed temperature is applied and maintained on the sample and the time dependent decay of stress is recorded.

A UHMWPE film as described herein may generally be free from polymer solvent, due to its manufacturing method, as will be described in more detail below. More in particular, UHMWPE films may generally have a polymer solvent content of less than 0.05 wt. %, in particular less than 0.025 wt. %, more in particular less than 0.01 wt. %.

The UHMWPE films are provided with a continuous polymer film.

The general purpose of the polymer film is to act as organic matrix material, providing UHMWPE films with at least one adhering surface. For instance, in a ballistic-resistant article as described herein UHMWPE films are bonded together through at least the organic matrix polymer film. Further, the polymer film ensures that the UHMWPE film does not suffer from fibrillation during handling and usage, improving the wear resistance of the UHMWPE film and ballistic-resistant articles comprising the same. The polymer (film) is also referred to herein as organic matrix polymer (film).

A continuous polymer film ensures that there is an uniform organic matrix material distribution over the surface of the UHMWPE films, in other words the UHMWPE film has no gaps in the coverage with the organic matrix material. Thereby, the adhesion and wear resistance properties of the UHMWPE film are uniform throughout its surface.

The organic matrix polymer film preferably has melting point below the melting point of the UHMWPE film.

The organic matrix polymer film may have the same chemical make-up as the UHMWPE film. Alternatively, a polymer with a different chemical make-up may be used as organic matrix material.

Examples of suitable organic matrix materials include polymers such as thermoplastic elastomers. Suitable thermoplastic elastomers include polyurethanes, polyvinyls, polyacrylates, block copolymers and mixtures thereof. In one embodiment, the thermoplastic elastomer is a block copolymer of styrene and an alpha-olefin comonomer. Suitable comonomers include C4-C12 alpha-olefins such as ethylene, propylene, and butadiene. Particular examples include polystyrene-polybutadiene-polystyrene (SBS) polymer or polystyrene-polyisoprene-polystyrene (SIS). Such polymers are commercially available, e.g., under the trade name Kraton or Styroflex.

Polyolefin based films may be preferred as organic matrix material. These polyolefins include polypropylene; polyethylene, such as high density polyethylene(HDPE), low density polyethylene (LDPE), medium density polyethylene (MDPE), linear low density polyethylene (LLDPE); ethylene α-olefin copolymers, such as ethylene-propylene copolymers and ethylene vinyl acetate copolymers; or combinations thereof.

It is preferred for the organic matrix polymer film to be a polyethylene film, preferably a LDPE film or a HDPE film. Such films have the same chemical make-up as the UHMWPE film and it advantageously allow for an easier recycling of the UHMWPE films provided with organic matrix material and ballistic-resistant articles manufactured therefrom. Further, polyethylene has good adhesive properties and is perfectly compatible with UHMWPE.

The organic matrix polymer film (also referred to herein as matrix film) is provided over at least 95% of at least one of the UHMWPE film surfaces. In particular, the matrix film may cover over at least 97% of at least one of the surfaces of the UHMWPE film, more in particular at least 99%, even more in particular at least 99.5%. In one embodiment 100% of at least one of the surfaces of the UHMWPE film may be covered by the matrix film.

As indicated above, the film of organic matrix polymer is continuous. Accordingly, where the organic matrix polymer film does not cover a whole surface of the UHMWPE film, i.e. coverage is less than 100%, the surface area of UHMWPE film which is not covered with the organic matrix film will typically be found at the edges along the length of the UHMWPE film.

Generally, the coverage of the UHMWPE film by the continuous organic matrix polymer film is determined by the width of the stretchable UHMWPE lamina and the stretchable organic matrix polymer film used in the preparation of the UHMWPE film provided with an organic matrix material as described in more detail below. Thus, the coverage of the surface of the UHMWPE film with the organic matrix polymer film may be determined in a straightforward way. Furthermore, if any, the areas of UHMWPE film which are not covered with organic matrix polymer film can be distinguished by a clear difference in appearance when compared to the covered areas and define a line. Thus, the fraction total coverage can be easily determined, e.g., as the ratio of the covered width to the total width.

Provided that at least one of the surfaces of the UHMWPE film is covered with the organic matrix polymer film, the second surface of the UHMWPE film may be free of organic matrix material or it may also be covered with an organic matrix polymer film. If covered with an organic matrix polymer film, the organic matrix polymer film is preferably provided over at least 95%, or at least 97%, 99%, 99.5% or even 100% of the second UHMWPE film surface. However, it may be preferred for the second surface of the UHMWPE film to be free of organic matrix material. Such films will allow providing ballistic-resistant articles with a lower amount of organic matrix material than, e.g., films with both surfaces covered with organic matrix material.

In a ballistic-resistant article described herein the UHMWPE films have thickness of 10-100 microns, in particular 20-80 microns, more in particular 30-70 microns, and even more in particular 40-65 microns. The organic matrix polymer film has a thickness of 0.1-3 microns, in particular 0.15-2.5 microns, more in particular 0.2-2 microns, yet more in particular 0.4-1.5 microns.

By having such a thin layer of organic matrix material, the disruption of the performance of the UHMWPE film is minimal. In particular, ballistic-resistant articles comprising films as described herein have excellent ballistic properties despite having the organic matrix polymer film (which generally is a material of low ballistic performance) covering a large surface of the UHMWPE film (which is a material with high ballistic performance).

In a ballistic-resistant article as described herein, the weight percentage of the organic matrix polymer with respect to the total weight of organic matrix polymer and ultra-high molecular weight polyethylene is from 0.1 to 3 wt. %, in particular from 0.15 to 2.5 wt. %, and may preferably be from 0.2 to 2 wt. %, or even from 0.5 to 1.5 wt. %. The inventors have surprisingly found that such small amounts of organic matrix material can be advantageously used in ballistic-resistant articles given the high coverage of the organic matrix material over the UHMWPE films. Also surprisingly, such small amounts of organic matrix materials may be obtained using a method as described herein, whereby a UHMWPE film is co-stretched with a polymer film as organic matrix material.

Advantageously, owing to the low amount of organic matrix polymer, the ballistic-resistant articles comprising films as disclosed herein have a reduced amount of low performing materials which in combination with the thin and uniform distribution of the organic matrix polymer contributes to the performance of the ballistic-resistant articles.

UHMWPE films provided with organic matrix material as described herein may have a width of at least 2 mm, in particular at least 10 mm, more in particular at least 20 mm. The width of the film is not critical and may generally be at most 500 mm.

The physical properties of UHMWPE films provided with an organic matrix material as described herein are very similar or even the same to those of UHMWPE films which are not provided with an organic matrix polymer film. In particular, such UHMWPE films generally have a high tensile strength, a high tensile modulus and a high energy absorption, reflected in a high energy-to-break.

In one embodiment, the tensile strength of the UHMWPE films provided with an organic matrix material is at least 1.2 GPa, more in particular at least 1.5 GPa, still more in particular at least 1.8 GPa, even more in particular at least 2.0 GPa. In one embodiment, the tensile strength of these films is at least 2.0 GPa, in particular at least 2.5 GPa, more in particular at least 3.0 GPa, still more in particular at least 4 GPa. Tensile strength may be determined in accordance with ASTM D7744-11.

In one embodiment, the UHMWPE films provided with an organic matrix material have a tensile modulus of at least 50 GPa. More in particular, the films may have a tensile modulus of at least 80 GPa, more in particular at least 100 GPa, still more in particular at least 120 GPa, even more in particular at least 140 GPa, or at least 150 GPa. The modulus may be determined in accordance with ASTM D7744-11.

In one embodiment, the UHMWPE films provided with an organic matrix material have a tensile energy to break of at least 20 J/g, in particular at least 25 J/g. In another embodiment, the tapes have a tensile energy to break of at least 30 J/g, in particular at least 35 J/g, more in particular at least 40 J/g, still more in particular at least 50 J/g. The tensile energy to break may be determined in accordance with ASTM D7744-11 (calculated by integrating the energy per unit mass under the stress-strain curve).

UHMWPE films provided with an organic matrix material used in the present invention, may have a high strength in combination with a high linear density. In the present application the linear density is expressed in dtex. This is the weight in grams of 10000 metres of film. In one embodiment, the film according to the invention has a denier of at least 3000 dtex, in particular at least 5000 dtex, more in particular at least 10000 dtex, even more in particular at least 15000 dtex, or even at least 20000 dtex, in combination with strengths of, as specified above, at least 2.0 GPa, in particular at least 2.5 GPa, more in particular at least 3.0 GPa, still more in particular at least 3.5 GPa, and even more in particular at least 4 GPa.

In a ballistic-resistant article as described herein, sheets comprise at least two layers of ultra-high molecular weight polyethylene (UHMWPE) films provided with an organic matrix material. In particular sheets may comprise at least 3, at least 4, or at least 6 layers of films and at most 20, at most 15 or at most 10 layers of films. Sheets comprising two layers of films may be preferred.

The orientation of the UHMWPE films provided with the organic matrix material within the layer of films may preferably be unidirectional. For instance, the films may be aligned in parallel to form a layer.

UHMWPE films provided with the organic matrix material may partially overlap within a layer or may be aligned without an area of overlap between neighbouring films, e.g., films may be in abutting contact or there may be small gaps between neighbouring films. By small gaps is understood that less than 5% of the areal surface of the layer corresponds to gaps. It may be preferred for the films to be aligned in abutting contact without significant gaps in between neighbouring films, e.g. less than 0.5% of the areal surface of the layer corresponds to gaps.

Optionally, the orientation of the films in one layer may be at an angle to the orientation of the films in an adjacent layer. The angle between the orientation of the films in one layer and the orientation of the films in an adjacent layer may be from 45 to 135 degrees, or from 60 to 120 degrees, or from 85 to 95 degrees, or of about 90 degrees. In a particular embodiment, the orientation of the films in one layer may be parallel with respect to the orientation of the films in alternate layers. In another embodiment the orientation of the films in one layer may be at an angle with respect to the orientation of the films in alternate layers. What is said above with respect to the angle between adjacent layers also applies to the angle between alternate layers.

Layers of unidirectionally oriented films which are at an angle with respect to each other may be within the same sheet or in neighbouring sheets. For instance, a sheet may comprise at least two layers of unidirectionally oriented films which are at an angle to each other (e.g. a 0-90 construction). A sheet may also comprise at least two layers of unidirectionally oriented films which are parallel to each other (a 0-0 construction). Such sheets may particularly have a brick construction, in which the films of one layer are parallel to the films of the other layer but are placed offset thereto. A sheet with a 0-0 construction may be at an angle with respect to a neighbouring sheet with also a 0-0 construction. A sheet may also comprise at least four layers of unidirectionally oriented films. These layers maybe parallel to each other in groups of two and said groups of two may be at an angle with respect to each other (e.g. a 0-0-90-90 construction) or the layers may be at an angle with respect neighbouring layers (e.g. a 0-90-0-90 construction). Sheets comprising two layers in a 0-90 construction or four layers in a 0-90-0-90 construction may be preferred.

A stack of sheets of a ballistic-resistant article as described herein may comprise at least 2 sheets, in particular at least 4, at least 10 or at least 20 sheets, and at most 1000 sheets, and preferably at most 500 sheets or at most 250 sheets. The amount of sheets depends on the amount of film layers within one sheet and the threat level of ballistic resistance required. Suitable number of layers and sheets can be determined by a person skilled in the art.

Ballistic-resistant articles as described herein have the sheets in the stack consolidated.

The sheets as such may be consolidated (individually, e.g. prior to stacking as described in detail below) or the whole stack of sheets may be consolidated (together, i.e. after stacking as described also in detail below). If the sheets as such are consolidated, the whole stack does not need be consolidated but may also be consolidated. Thus, the sheets may be consolidated prior to and after stacking, i.e. individually and in the stack as a whole.

The term consolidated as used herein means that the UHMWPE films in sheet layers or in the stack of sheets are firmly attached to one another by the organic matrix material. Accordingly, in one embodiment the ballistic-resistant article comprises sheets which are individually consolidated, i.e. the at least two layers of UHMWPE films provided with an organic matrix material present in the sheet are firmly attached to one another. In another embodiment, the stack of sheets of the ballistic-resistant article is consolidated as a whole, i.e. layers of UHMWPE films provided with an organic matrix material within a sheet and of adjacent sheets are firmly attached to one another.

The sheets or the stack of sheets may be consolidated by the application of pressure and optionally heat, as it is known in the art and as it will be elucidated in more detail below.

A stack of sheets as described herein may be used as such as a ballistic resistant article or may be further processed to form a ballistic resistant article. For instance, a stack of individually consolidated sheets as described herein may be used as, e.g., a ballistic-resistant article for soft-ballistic applications. A stack of sheets consolidated as a whole as described herein may be used as, e.g., a ballistic-resistant article for hard-ballistic applications.

Additionally, the stack of sheets may be stitched together on the peripheral edges or placed in a holding bag to conform a ballistic-resistant article.

Alternatively or additionally, the stack of sheets may be combined with stacks or sheets of other ballistic-resistant materials, such as non-woven unidirectional layers (UDs) or woven fabrics of UHMWPE fibre, aramid fibre, or aramid copolymer fibre.

Alternatively or additionally, the stack of sheets may be shaped to provide a ballistic resistant article with a specific shape, e.g. a helmet, a single curved panel, a double curved panel, or a multi-curved panel.

Alternatively or additionally, the stack of sheets may be used in combination with other ballistic materials such as ceramic or steel strike faces. In a particular embodiment the stack of sheets may be shaped together with such ballistic materials, as explained in more detail below.

The instant invention further relates to a process for the manufacture of a ballistic-resistant article as described herein comprising the steps of
   a) stacking a stretchable lamina of ultra-high molecular weight polyethylene (UHMWPE) and a stretchable continuous film of a polymer as organic matrix material to form a lamina-film stack,
   b) elongating the lamina-film stack formed in step a) at a temperature below the melting point of the stretchable UHMWPE lamina, to an elongation ratio of at least 2, thereby providing a UHMWPE film with an organic matrix material having the UHMWPE film co-stretched with the film of polymer as organic matrix material,
   c) aligning a plurality of films provided according to step b) to form a layer of films,
   d) stacking at least two layers of films formed according to step c) to form a sheet,
   e) stacking a plurality of sheets formed according to step to form a stack of sheets, and
   f) consolidating the sheets prior to and/or after stacking according to step e) by applying pressure and optionally heat.

A stack of sheets obtained according to a method described herein may conform a ballistic resistant article as such or may be further processed to obtain a ballistic resistant article.

The instant invention relates to ballistic resistant articles obtainable by such processes.

In a process as described herein UHMWPE films provided with an organic matrix material are obtained by stacking a stretchable UHMWPE lamina with a stretchable continuous film of a polymer as organic matrix material (step a) and subjecting the so obtained lamina-film stack to an elongation step (step b).

The term "stretchable" means that the lamina or film can be subjected to an elongation step. Elongation can be achieved by either rolling or stretching or any combination thereof. Rolling can be carried out in a single or multiple steps. Stretching can be carried out in a single or multiple steps. The lamina-film stack can be subjected to, e.g., an elongation ratio of at least 2, without substantially affecting the integrity of the film, e.g. by breaking or tearing in length direction of the film. The presence of microscopic voids in the film formed during elongation are not considered to affect the integrity of the film.

Stacking of the stretchable continuous polymer film may be performed on a stretchable UHMWPE lamina preferably obtained by solid state processing as described in more detail below. In particular a stretchable UHMWPE lamina which may be used in the present invention may be manufactured by solid state processing of the UHMWPE, which process comprises compacting a UHMWPE powder into a plate, optionally rolling and further optionally stretching the resulting compacted plate, preferably under such conditions that at no point during the processing of the polymer its temperature is raised to a value above its melting point. Suitable methods for solid state processing of UHMWPE are known in the art and require no further elucidation here. Reference is made to, e.g., WO2009/109632, WO2009/153318 and WO2010/079172.

The starting material for manufacturing such UHMWPE films may be a highly disentangled UHMWPE. The elastic shear modulus $G°_N$ directly after melting at 160° C. is a measure for the degree of entangledness of the polymer. In particular, the starting polymer may have an elastic shear modulus $G°_N$ determined directly after melting at 160° C. of at most 1.4 MPa, in particular at most 1.0 MPa, more in particular at most 0.9 MPa, still more in particular at most 0.8 MPa, and even more in particular at most 0.7 MPa. The wording "directly after melting" means that the elastic modulus is determined as soon as the polymer has melted, in particular within 15 seconds after the polymer has melted. For this polymer melt, the elastic modulus typically increases from 0.6 to 2.0 MPa in several hours. $G°_N$ is the elastic shear modulus in the rubbery plateau region. It is related to the average molecular weight between entanglements ($M_e$), which in turn is inversely proportional to the entanglement density. In a thermodynamically stable melt having a homogeneous distribution of entanglements, $M_e$ can be calculated from $G°_N$ via the formula $G°_N = g_N \rho R T/M_e$, where $g_N$ is a numerical factor set at 1, rho (p) is the density in g/cm³, R is the gas constant and T is the absolute temperature in K. A low elastic modulus thus stands for long stretches of polymer between entanglements, and thus for a low degree of entanglement. The method is adopted from the investigation on changes in with the entanglements formation as described in: the publication of Rastogi, S., Lippits, D., Peters, G., Graf, R., Yefeng, Y. and Spiess, H., titled "Heterogeneity in Polymer Melts from Melting of Polymer Crystals", Nature Materials, 4(8), 1 Aug. 2005, 635-641; and the PhD thesis of Lippits, D. R., titled "Controlling the melting kinetics of polymers; a route to a new melt state", Eindhoven University of Technology, dated 6 Mar. 2007, ISBN 978-90-386-0895-2.

Such a disentangled polyethylene may be manufactured by a polymerisation process wherein ethylene is polymerised in the presence of a single-site polymerisation catalyst at a temperature below the crystallisation temperature of the polymer, so that the polymer crystallises immediately upon formation. Suitable methods for manufacturing polyethylene's used in the present invention are known in the art. Reference is made, for example, to WO01/21668 and U520060142521.

In one embodiment, UHMWPE films provided with an organic matrix material used in the present invention have a high molecular orientation as is evidenced by their XRD diffraction pattern. In one embodiment of the present invention, the UHMWPE films have a 200/110 uniplanar orientation parameter Φ of at least 3. The 200/110 uniplanar orientation parameter Φ is defined as the ratio between the 200 and the 110 peak areas in the X-ray diffraction (XRD) pattern of the film sample as determined in reflection geometry. The 200/110 uniplanar orientation parameter gives information about the extent of orientation of the 200 and 110 crystal planes with respect to the film surface. For a film sample with a high 200/110 uniplanar orientation the 200 crystal planes are highly oriented parallel to the film surface. It has been found that a high uniplanar orientation is generally accompanied by a high modulus, high tensile strength and high tensile energy to break. The ratio between the 200 and 110 peak areas for a specimen with randomly oriented crystallites is around 0.4. However, UHMWPE films may be preferably used may have crystallites with indices 200 which are preferentially oriented parallel to the film surface, resulting in a higher value of the 200/110 peak area ratio and therefore in a higher value of the uniplanar orientation parameter. This parameter can be determined as described in WO2009/109632.

The UHMWPE films may preferably have a 200/110 uniplanar orientation parameter of at least 4, more in particular at least 5, or at least 7. Higher values, such as values of at least 10 or even at least 15 may be particularly preferred. The theoretical maximum value for this parameter is infinite if the peak area 110 equals zero.

The stretchable continuous polymer film may be stacked on the stretchable UHMWPE lamina obtained directly after compacting, onto a stretchable UHMWPE lamina obtained after subjecting a compacted plate to rolling or onto a stretchable UHMWPE lamina obtained after subjecting a compacted plate to rolling and stretching. Thus, prior to stacking, the stretchable UHMWPE lamina may have been partially elongated by rolling and optionally also by stretching.

The elongation ratio obtained with the rolling step may be of at least 2, in particular at least 4, at least 5 or at least 6 and of at most 12, at most 10 or at most 8. The elongation ratio obtained with the partial-stretching step may be of at least 2, in particular at least 4, at least 5 or at least 6 of at most 12, at most 10 or at most 8. The elongation ratio is defined as the area of the cross-section of the stretchable UHMWPE lamina as it enters the rolling step or the stretching step divided by area of the cross-section of stretchable UHMWPE lamina as it leaves the rolling or stretching step.

A stretchable lamina of UHMWPE as used herein may preferably have a thickness of 50-3000 microns, in particular 75-2500 microns, more in particular 100-2250 microns.

In one embodiment of the present invention, the lamina-film stack is formed by stacking the stretchable continuous polymer film onto a stretchable UHMWPE lamina as obtained prior to subjecting a compressed UHMWPE plate to a rolling step. In this embodiment, the stretchable lamina of UHMWPE may preferably have a thickness of 500-3000 microns, in particular 1000-2500 microns, and even more in particular 1250-2250 microns.

In another embodiment, the lamina-film stack is formed by stacking the stretchable continuous polymer film onto a stretchable UHMWPE lamina obtained after subjecting the compressed UHMWPE plate to a rolling step but prior to subjecting it to a stretching step. In this embodiment, the stretchable lamina of UHMWPE may preferably have a thickness of 200-1200 microns, in particular 300-1000 microns, and even more in particular 400-800 microns.

In yet another embodiment, the lamina-film stack is formed by stacking the stretchable continuous polymer film onto a stretchable UHMWPE lamina obtained after subjecting the rolled plate to at least one stretching step. In this embodiment, the stretchable lamina of UHMWPE may preferably have a thickness of 50-500 microns, in particular 75-300 microns, and even more in particular 100-200 microns.

A stretchable polymer film as organic matrix material used herein may preferably have a thickness of 4-25 microns, in particular 5-15 microns, even more in particular 6-10 micron.

Subjecting the lamina-film stack to an elongation step provides several advantages. For instance, the organic matrix material may be applied to a stretchable UHMWPE lamina as a stretchable polymer film using films which, despite resulting in low amounts of organic matrix material, are relatively thick at the beginning of the process. Such method represents an improvement in that the starting stretchable matrix films are easier to handle than thinner films (e.g. they are easier to stack on top of UHMWPE films). Further, very thin films as obtained in a process described herein are not commercially available, as they are difficult to produce and to handle. In addition, during the elongation process good bonding of the organic matrix polymer film to the UHMWPE film is obtained.

A particular advantage of applying the stretchable polymer film onto the stretchable UHMWPE lamina which has not been subject to rolling is that the lamina-film stack can be subjected to a higher elongation ratio (by applying both rolling and stretching steps to the lamina-film stack) and ultimate thickness reduction of the organic matrix polymer film can be achieved.

The width of the stretchable UHMWPE lamina as it enters the process according to the invention is not critical. It may be of, e.g., at least 1 cm, in particular at least 5 cm, more in particular at least 10 cm. In general, the maximum width may be of at most 150 cm.

The use of a continuous organic matrix polymer film may generally provide a continuous coverage of the UHMWPE film with the organic matrix material.

A stretchable organic matrix polymer film may be stacked on top of a stretchable UHMWPE lamina in parallel in order to maximize the coverage of the UHMWPE film by the organic matrix material.

The stretchable continuous organic matrix polymer film as used in the stack will generally not be wider than the stretchable UHMWPE lamina, to avoid the presence of excessive amount of organic matrix material. To ensure high coverage of the UHMWPE film with the organic matrix polymer film, it may be preferred for the width of the stretchable organic matrix polymer film to be at least 90% of the width of the stretchable UHMWPE lamina. More in particular, the width of the stretchable organic matrix polymer film may be at least 95%, or at least 99% or even at least 99.5% of the width of the stretchable UHMWPE lamina. In one embodiment, the width of the stretchable organic matrix polymer film is the same as the width of the stretchable UHMWPE lamina.

Stretchable organic matrix polymer films are commercially available or may be provided by known methods. For instance, these films can be produced by film blowing or film extrusion, which are methods well-known in the art.

The elongating step of the lamina-film stack is carried out at a temperature below the melting point of the stretchable UHMWPE lamina. The elongating step is generally carried out at a temperature of at least 1° C. below the melting point of the stretchable UHMWPE lamina under process conditions. Depending on the nature of the UHMWPE polymer, the temperature may be lower, e.g., at least 3° C. or even at least 5° C. below the melting point of the stretchable UHMWPE lamina under process conditions. The temperature of the elongating step is thus generally governed by the melting point of the stretchable UHMWPE lamina.

The melting point of the stretchable organic matrix polymer film (or the softening point for organic matrix materials which do not have a melting point, e.g. block copolymers such as SIS) is generally below the melting point of the stretchable UHMWPE lamina. In particular, the melting point or softening point of the organic matrix polymer film may generally be 5-50° C. below the melting point of the UHMWPE film, in particular 10-45° C., more in particular 15-30° C.

The elongating step may be carried out at a temperature below the melting point of the stretchable organic matrix polymer film or, provided that the temperature is maintained below the melting point of the stretchable UHMWPE lamina, above the melting point of the stretchable organic matrix polymer film. It may be preferred for the stretching step to be performed at a temperature above the melting point of the stretchable organic matrix polymer film to prevent matrix polymer film tearing during stretching and thereby to ensure a homogeneous distribution of the matrix polymer on the UHMWPE film.

As a skilled person knows, the melting point of polymers may depend upon the constraint under which they are put. This means that the melting temperature under process conditions may vary from case to case. Nonetheless, the melting point can easily be determined as the temperature at which the stress tension in the process drops sharply. The unconstrained melting point of the stretchable UHMWPE lamina and the stretchable organic matrix polymer film may be determined by the person skilled in the art via, for instance, DSC (differential scanning calorimetry). In particular, DSC may be performed in nitrogen, over a temperature range of +30 to +180° C. and with an increasing temperature rate of 10° C./minute. The maximum of the largest endothermic peak at from 80 to 170° C. is evaluated here as the melting point.

Generally, the elongating step is carried out at a temperature of at most 30° C. below the melting point of the stretchable UHMWPE lamina under process conditions, in particular at most 20° C., more in particular at most 15° C. below the melting point of the film under process conditions.

The elongating ratio applied to the lamina-film stack in a process according to the invention is at least 2, in particular at least 6, or at least 10, or at least 20, or at least 28, or even at least 100, or at least 150.

The elongation ratio is defined as the area of the cross-section of the lamina-film stack as it enters the elongating step divided by area of the cross-section of UHMWPE film provided with the organic matrix material as it leaves the elongating step.

The maximum elongation ratio generally is the highest elongation ratio that may be achieved without damaging the integrity of the lamina-film stack and will depend on the properties of the starting stretchable materials and the processing conditions. Generally, elongating of the lamina-film stack will be performed to its maximum or as close as possible to its maximum. A skilled person can easily determine such a maximum for a given system. As a mode of example the stretching ratio may be of at most 400, at most 300 or at most 200.

Generally, the elongation ratio of the lamina-film stack in the elongating step may depend on the degree to which the starting stretchable UHMWPE lamina has been elongated, if elongated at all, in any rolling and stretching steps used in its preparation.

Generally, the lower the elongation ratio of the starting stretchable UHWMPE lamina (as obtained during its preparation) the higher the elongation ratio may be applied during the elongation of the lamina-film stack.

The elongation ratio may also be influenced by the number of elongating steps, e.g. rolling and stretching steps. Generally, the higher the number of elongating steps the higher the stretching ratio that may be achieved. Generally elongating in step b) is may be performed in at least two elongating steps, or in at least three elongating steps.

Elongating may be performed in a combination of rolling and/or stretching steps. If rolling is performed, the rolling of the lamina-film stack may be performed in at least two steps or even at least three steps. If stretching is performed, the stretching of the lamina-film stack may be performed in at least two steps or even at least three steps.

It may be preferred to maximize the stretching ratio of the lamina-film stack in order to minimize the amount and the thickness of the organic matrix polymer film covering the UHMWPE film. This may be achieved by, for instance, elongating a lamina-film stack obtained by stacking the stretchable organic matrix polymer film onto a stretchable UHMWPE lamina, which has been obtained after rolling a UHMWPE compacted plate (without performing any partial-stretching steps), the elongation ratio of said rolling step being of, e.g., 2-6. For instance, the elongation ratios achieved for the lamina-film stack in the elongating step starting from such stretchable UHMWPE lamina may be 20-50. The total elongation ratio of the final UHMWPE film provided with the organic matrix material being of 80-300. Higher elongation ratios of the lamina-film stack may be achieved by elongating a lamina-film stack obtained by stacking the stretchable organic matrix polymer film onto a stretchable UHMWPE lamina which has not been previously elongated, e.g. obtained directly after compacting UHMWPE powder into a UHMWPE plate in a solid state process. For instance, the elongation ratios achieved for the lamina-film stack in the elongating step starting from such stretchable UHMWPE lamina may be 80-300, which would correspond to the total elongation ratio of the final UHMWPE film provided with the organic matrix material.

It has been found that stacking the stretchable organic matrix polymer film onto the stretchable UHMWPE lamina and subjecting the lamina-film stack to elongating advantageously results in a co-stretched film where the ballistic properties of the UHMWPE film remain unaffected, i.e. are comparable to those of a film obtained with the same rolling/stretching steps in absence of an organic matrix polymer film. Further, a method as described herein allows for great control of the distribution of the organic matrix polymer film over the UHMWPE film.

Furthermore, the use of UHMWPE films which are provided with an organic matrix material greatly simplifies the production of ballistic-resistant articles. In particular, since the UHMWPE films adhere to each other thanks to the presence of organic matrix polymer film, it is not required to independently provide an organic matrix material and to integrate the application of the organic matrix material in the process of manufacture of the ballistic-resistant articles.

UHMWPE films which are provided with an organic matrix material according to step b) of a process as described herein may be referred to as co-stretched films.

A process as described herein further comprises aligning a plurality of films provided according to step b) to form a layer of films (step c).

The co-stretched films may be preferably aligned in parallel, thereby forming a layer of unidirectionally oriented co-stretched films or, in other words, whereby the orientation of the UHMWPE films provided with the organic matrix material within the layer of films is unidirectional.

The films may be aligned in parallel in an overlapping fashion. Thereby, organic matrix material present in the overlapping area of the films may help to adhere the films to each other.

Alternatively and, in some embodiments, preferably, the films are aligned in parallel so that they do not overlap, e.g., films may be in abutting contact or there may be small gaps between neighbouring films, preferably in abutting contact without significant gaps in between neighbouring films, as described above for the ballistic-resistant article. Thereby, layers are obtained which have an homogeneous thickness, i.e. are free of areas of overlap.

A process as described herein further comprises stacking at least two layers of films formed according step c) to form a sheet (step d).

Sheets may be formed by aligning a plurality of co-stretched films to form a first layer of films and stacking a second layer of films on top of the first layer by aligning a plurality of co-stretched films directly on top of said the first layer, thereby forming a sheet of two layers of films.

Additional layers of films may be stacked in a similar manner to form a sheet of, e.g., at least 3, 4, 6 or more layers as described above for the ballistic-resistant article. Stacking may be performed to provide a desired orientation of the films in one layer with respect to the orientation of the films in an adjacent layer as described in detail above.

For instance, co-stretched films may be aligned on top of a first layer of co-stretched films to form a second layer of co-stretched films whereby the orientation of the films in the first layer is the same as the orientation of the films in the second layer, i.e. the films in the first and second layers are parallel to each other in a 0-0 construction. In a particular embodiment, the films of the second layer are offset with respect to the films of the first layer in a so-called brick construction.

Alternatively, co-stretched films may be aligned on top of a first layer of co-stretched films to form a second layer of co-stretched films whereby the orientation of the films in the first layer is at an angle with respect to the orientation of the films in the second layer. With respect to preferred angles of orientation reference is made to what is described above for the ballistic-resistant article. For instance, a sheet may be provided with at least two layers in a 0-90 construction.

Additional layers of co-stretched films may be stacked to perpetuate such constructions until a sheet with a desired number of layers is obtained.

A process as described herein further comprises stacking a plurality of sheets formed according step d) to form a stack of sheets. Sheets may be stacked in the same way as described above for the stacking layers of co-stretched films, whereby the sheets are formed during stacking. Alternatively, sheets may be individually pre-formed and then stacked on top of each other. Stacking of the sheets may be performed to achieve a desired film orientation within the stack. For instance two sheets of a 0-90 construction may be stacked to provide a 0-90-0-90 stack construction. Alternatively, two sheets of a 0-0 construction may be stacked perpendicularly to provide a 0-0-90-90 stack construction. Additional sheets may be stacked to perpetuate such constructions within the stack until a stack with a desired number of sheets is obtained.

A process as described herein further comprises consolidating the sheets prior to and/or after stacking according to step e) by applying pressure and optionally heat. Thus, the sheets may be individually consolidated prior to stacking and/or the stack of sheets may be consolidated as a whole after stacking.

A sheet or the stack of sheets may be consolidated by the application of pressure and optionally heat, as it is known in the art. For instance, a sheet or the stack of sheets may be placed in a press and subjected to compression.

A sheet or the stack of sheets may be compressed by applying a pressure of, for instance, at least 0.1 MPa. A maximum pressure of at most 50 MPa may be mentioned. The pressure to be applied is intended to ensure the formation of a ballistic-resistant article with adequate properties.

The use of pressure may suffice to cause the UHMWPE films in the sheet or in the stack of sheets to adhere to each other through the organic matrix material. However, where necessary, the temperature during compression may be selected such that the organic matrix material is brought above its softening or melting point, if this is necessary to cause the matrix to help adhere the films and/or sheets to each other.

The required compression time and compression temperature may depend on the nature of the UHMWPE films and organic matrix material and on the thickness of the sheet or stack of sheets to be consolidated, and can be readily determined by a person skilled in the art.

Consolidation may be performed at a compression temperature above the softening or melting point of the organic matrix material (i.e. organic matrix polymer film) and below the melting point of the UHMWPE films. Where the compression is carried out at such temperature, it may be preferred for the cooling of the compressed material (i.e. a sheet or the stack of sheets) to also take place under pressure, whereby a given minimum pressure is maintained during cooling at least until a temperature is reached at which the structure of the sheet or stack of sheets can no longer relax under atmospheric pressure. It is within the scope of the skilled person to determine this temperature on a case by case basis. Where applicable it is preferred for cooling to be performed at the given minimum pressure to reach a temperature at which the organic matrix material has largely or completely hardened or crystallized and below the relaxation temperature of the UHMWPE film. The pressure during the cooling does not need to be equal to the pressure used for consolidation. During cooling, the pressure may be monitored so that appropriate pressure values are maintained, to compensate for decrease in pressure caused by shrinking of the sheet or the stack of sheets in the press.

Consolidation as described above may be performed in a static press or in a continuous process. Suitable continuous processes comprise, but are not limited to, lamination, calandering and double-belt pressing.

A method described herein provides a stack of sheets which as such may conform a ballistic resistant article or may be further processed to obtain a ballistic resistant article.

For instance, whether or not the sheets as such are consolidated or the stack of sheets as a whole is consolidated, further steps in a method described herein may include placing the stack of sheets in a holding bag or stitching together the peripheral edges of the stack of sheets.

Other further steps may include for instance combining the stack of sheets with stacks or sheets of other ballistic-resistant materials, such as non-woven unidirectional layers (UDs) or woven fabrics of UHMWPE fibre, aramid fibre, or aramid copolymer fibre.

Alternatively or additionally, further steps my comprise shaping the stack of sheets to provide a ballistic resistant article with a specific shape, e.g. a helmet, a single curved panel, a double curved panel, or a multi-curved panel.

Alternatively or additionally, further steps my comprise combining the stack of sheets with other ballistic materials such as ceramic or steel strike faces. In a particular embodiment, the process may comprise shaping the stack of sheets together with such ballistic materials, e.g. using vacuum consolidation, so that the stack of sheets adapts to the shape of the additional ballistic material, e.g. a pre-shaped ceramic or steel strike face.

The present invention also relates to ballistic resistant articles obtainable by processes of manufacture as described herein.

The instant invention is further illustrated by the following examples without being limited thereto or thereby.

EXAMPLES

General Methods

Modulus of UHMWPE films and UMWPE co-stretched films can be determined according to ASTM D7744/D7744M-11, Standard Test Methods for Tensile Testing of High Performance Polyethylene Tapes in consideration of ASTM D76 Standard Specification for Tensile Testing Machines for Textiles and ASTM D1776 Standard Practice for Conditioning and Testing Textiles.

Thickness of UHMWPE film and UHMWPE co-stretched film can be determined with a digital micrometer such as available from Mitutoyo. The thickness is measured on at least three positions spread over the width of the film and is averaged.

During consolidation of the stack in a press, a thermocouple is inserted in the middle of the stack. The temperature that is measured is defined as the core temperature.

Example 1

An HDPE film having a thickness of 6 micron and a melting point of 128° C. was stacked onto a stretchable UHMWPE lamina with a thickness of 320 micron obtained by compacting UHMWPE powder into a UHMWPE plate and rolling the UHMWPE plate to a elongation ratio of 5. The lamina-film stack was elongated by stretching above the melting temperature of HDPE and below the melting temperature of UHMWPE. The elongation ratio of the lamina-film stack was 36. This resulted in a UHMWPE film provided with organic matrix material with total elongation ratio of 5×36=180 and a total average thickness of around 43 micron including an HDPE layer, which has an average thickness of around 1 micron. The surface coverage of the organic matrix material over the UHMWPE film was 96%. The weight percentage of the organic matrix polymer with respect to the total weight of organic matrix polymer and UHMWPE was 1.5 wt. %. The modulus of the UHMWPE film provided with organic matrix material was 186.3 N/tex.

Example 2

An HDPE film having a thickness of 6 micron and a melting point of 128° C. was stacked onto an UHMWPE lamina with a thickness of 170 micron obtained by compacting UHMWPE powder into a UHMWPE plate, rolling the UHMWPE plate to a elongation ratio of 5 and stretching the rolled sheet to a combined elongation ratio of 20. The lamina-film stack was elongated by stretching above the melting temperature of HDPE and below the melting temperature of UHMWPE. The elongation ratio of the lamina-film stack was 6. This resulted in a film with a total elongation ratio of 20×6=120 and a total average thickness of around 58 micron including an HDPE layer, which had an average thickness of around 2 micron. The surface coverage of the organic matrix material over the UHMWPE film was 95%. The weight percentage of the organic matrix polymer with respect to the total weight of organic matrix polymer and UHMWPE was 3 wt. %. The modulus of the UHMWPE film provided with organic matrix material was 166.9 N/tex.

Example 3

An LDPE film having a thickness of 10 micron and a melting point of 115° C. was stacked onto an UHMWPE lamina with a thickness of 320 micron obtained by compacting UHMWPE powder into a UHMWPE plate and rolling the UHMWPE plate to a elongation ratio of 5. The lamina-film stack was elongated by stretching above the melting temperature of LDPE and below the melting temperature of UHMWPE. The elongation ratio of the lamina-film stack was 36. This resulted in a film with a total elongation ratio of 5×36=180 and a total average thickness of around 44 micron including an LDPE layer, which had an average thickness of around 1 micron. The surface coverage of the organic matrix material over the UHMWPE film was 95%. The weight percentage of the organic matrix polymer with respect to the total weight of organic matrix polymer and UHMWPE was 2 wt. %. The modulus of the UHMWPE film provided with organic matrix material was 183 N/tex.

Example 4

A first 0-90 crossply (sheet A) was produced on a Meyer lab laminator. Three rolls of 133 mm wide film obtained as described above in example 1 were positioned in an unwinding station. These films were led into the laminator with a minimal gap in between the films, so that the three films were aligned in parallel in abutting contact but without overlap, to form the bottom 0 degree film layer. On top of this 0 degree layer, three films of the same width and of 40 cm in length obtained in the same manner as in example 1 were positioned perpendicular to the 0 degree layer just before the entrance of the laminator forming a 90 degree film layer. The films in the 90 degree layer were manually positioned to achieve minimal overlap. After lamination a consolidated 0-90 cross-ply was obtained which was wound on a winding station.

In a second step, a second 0-90 cross-ply (sheet B) was produced on the same laminator as described above for sheet A except that, instead of three films 133 mm wide, four films were fed into the laminator, of which two had a width of 66.5 mm and two had a width of 133 mm.

In a third step, the cross-ply sheet A and the cross-ply sheet B were unwound and led into the laminator simultaneously to form and consolidate a 0-90-0-90 sheet crossply. The consolidated sheet crossply was wound on a winding station.

Comparative Example 1

In a comparative example, UHMWPE produced under similar conditions with similar mechanical properties as in Example 1 was used, however without HDPE or LDPE being stacked on the film surface, so no matrix was co-stretched with the UHMWPE film. The UHMWPE films had a thickness of 45 micron, a width of 133 mm and a total elongation ratio of 180, and a modulus of 184 N/tex. These films were also used to produce a 0-90-0-90 cross-ply sheet in the same way as described above for sheet C of Example 4, except that an HDPE film having a thickness of 6 micron and a melting point of 128° C. was placed in between each film layer to ensure adhesion between all adjacent layers. The weight percentage of the organic matrix polymer with respect to the total weight of organic matrix polymer and UHMWPE was 15 wt. %.

Example 5

Using the same laminator set-up as in Example 4, a roll of 0-0 UD sheet was produced. Three films as described in Example 1 of a width of 133 mm were unwound to form a first 0 degree film layer. On top of this film layer, four films were fed into the laminator, of which both films at the side of the layer had a width of 66.5 mm instead of 133 mm to produce a second 0 degree film layer parallel but off set to the first 0 degree film layer, forming a consolidated sheet with a brick-like structure (0-0 UD). The 0-0 UD sheet was wound on a winding station. Part of this 0-0 UD sheet was cut into sheet with a length of 40 cm.

In a second lamination step the 0-0 UD roll was unwound and fed into the laminator. The cut sheets of 40 cm length were perpendicularly placed on top of the 0-0 UD roll just before entering the laminator, to form and consolidate a 0-0-90-90 brick cross-ply sheet. The consolidated 0-0-90-90 brick cross-ply sheet was wound on a winding station.

Comparative Example 2

In a comparative example, UHMWPE produced under similar conditions with similar mechanical properties as in Example 1 was used, however without HDPE or LDPE being present on the film surface, so no matrix was co-stretched with the UHMWPE film. The UHMWPE films had a thickness of 45 micron a width of 133 mm and a total elongation ratio of 180, and a modulus of 184 N/tex. These films were used to produce a 0-0-90-90 brick cross-ply sheet as described in Example 5, wherein an HDPE film having a thickness of 6 micron and a melting point of 128° C. was placed in between each film layer to ensure adhesion between all adjacent layers. The weight percentage of the organic matrix polymer with respect to the total weight of organic matrix polymer and UHMWPE was 15 wt. %.

Test Results—Stacks of Individually Consolidated Sheets

Cross-plies as described above in Example 4, comparative Example 1, Example 5 and comparative Example 2 were cut into sheets of 40×40 cm. A number of sheets was stacked to achieve an areal weight of 3.1 kg/m². The stacks were stitched together at the corners. Of each sample, 5 stacks were prepared. Each stack was shot 8 times with a 9 mm Remington. v50 was determined from all 40 shots by logistic curve fitting. The results are presented in Table 1.

TABLE 1

| Example | v50 (m/s) |
| --- | --- |
| Example 5 (0-0-90-90) | 433 |
| Comparative example 2 | 417 |
| Example 4 (0-90-0-90) | 551 |
| Comparative example 1 | 491 |

The samples according to the invention with UHMWPE films co-stretched with the matrix material (Examples 4 and 5) show improved performance over the comparative examples (1 and 2) with the same sheet construction but with the matrix material added between sheets of UHMWPE films instead of being co-stretched with the UHMWPE films.

Test-Results—Stacks Consolidated as a Whole

Cross-plies as described above in Example 4 and comparative Example 1 were cut into 40×40 cm sheets. Sheets were stacked until the required areal weight was reached (as indicated in Table 2). Stacks were pressed at 55 bar and 135° C. core temperature. Flat plates were evaluated according to the NATO Standardization Agreement Stanag 2920 with 1.1 g Fragment Simulating Projectiles and a v50 was determined. Results are presented in Table 2.

TABLE 2

| Material | Areal weight (kg/m2) | v50 (m/s) |
| --- | --- | --- |
| Comparative Example 1 | 7.2 | 772 |
| Comparative Example 1 | 7.9 | 829 |
| Example 4 | 7.45 | 854 |

The sample according to the invention (Example 4) clearly shows best ballistic performance with the highest v50.

The invention claimed is:

1. A process for the manufacture of a ballistic resistant article comprising the steps of:
   a) stacking a stretchable lamina of ultra-high molecular weight polyethylene (UHMWPE) and a stretchable continuous film of polymer as organic matrix material to form a lamina-film stack, the continuous film of polymer as organic matrix material not being an UHMWPE film,
   b) elongating the lamina-film stack formed in step a) at a temperature below the melting point of the stretchable UHMWPE lamina, to an elongation ratio of at least 2, thereby providing a stretched lamina-film stack in which the UHMWPE lamina is co-stretched with the film of polymer as organic matrix material,
   c) aligning a plurality of stretched lamina-film stacks provided according to step b) to form a layer of the stretched lamina-film stacks,
   d) stacking at least two layers formed according to step c) to form a sheet,
   e) stacking a plurality of sheets formed according to step d) to form a stack of the sheets, and
   f) consolidating the sheets prior to and/or after stacking the sheets according to step e) by applying pressure and optionally heat.

2. The process of claim 1 wherein the stretchable UHMWPE lamina has a thickness of 50-3000 microns and the stretchable continuous organic matrix polymer film has a thickness of 4-25 microns.

3. The process of claim 1 wherein the melting point of the stretchable organic matrix polymer film is below the melting point of the stretchable UHMWPE lamina and the elongating in step b) is performed at a temperature above the melting point of the stretchable organic matrix polymer film.

4. The process of claim 1 wherein the elongation ratio in step b) is at least 6.

5. The process of claim 1 wherein the elongating in step b) is performed in at least two elongating steps, or in at least three elongating steps.

6. The process of claim 1 comprising consolidating one of the plurality of sheets formed according to step d) individually prior to the stacking in step e) by applying pressure and optionally heat onto the sheet.

7. The process of claim 1 comprising consolidating the stack of sheets formed in step e) as a whole after the stacking in step e) by applying pressure and optionally heat onto the stack of sheets.

8. A ballistic-resistant article comprising:
a stack of sheets, the sheets comprising at least two layers of ultra-high molecular weight polyethylene (UHMWPE) films provided with a continuous film of polymer as organic matrix material,
wherein the UHMWPE films are provided over at least 95% of at least one surface thereof with the continuous film of polymer as organic matrix material, the continuous film of polymer as organic matrix material not being an UHMWPE film,
wherein the UHMWPE films have a thickness of 10-100 microns and the organic matrix polymer film has a thickness of 0.1-3 microns,
wherein the weight percentage of the organic matrix polymer film with respect to the total weight of the organic matrix polymer film and the ultra-high molecular weight polyethylene films is from 0.1 to 3 wt. %,
wherein the sheets in the stack are consolidated, and
wherein an orientation of polymer molecules in the continuous film of polymer as organic matrix material in a first direction of the organic matrix polymer film differs from an orientation of polymer molecules in the continuous film of polymer as organic matrix material in a second direction of the organic matrix polymer film, wherein the first direction of the organic matrix polymer film and the second direction of the organic matrix polymer film are at an angle of 90°.

9. The ballistic-resistant article of claim 8 wherein the UHMWPE films are provided with the continuous film of polymer as organic matrix material over at least 97% of the at least one surface thereof.

10. The ballistic-resistant article of claim 8 wherein the weight percentage of the organic matrix polymer film with respect to the total weight of the organic matrix polymer film and the ultra-high molecular weight polyethylene films is from 0.15 to 2.5 wt. %.

11. The ballistic-resistant article of claim 8 wherein the organic matrix polymer film is a polyethylene film.

12. The ballistic-resistant article of claim 8 wherein the ultra-high molecular weight polyethylene films have a thickness of 20-80 microns, and the organic matrix polymer film has a thickness of 0.15-2.5 microns.

13. The ballistic-resistant article of claim 8 wherein an orientation of the UHMWPE films within each of the layers is unidirectional and, optionally, the orientation of the UHMWPE films in one of the layers is at an angle to the orientation of the UHMWPE films in an adjacent one of the layers.

14. The ballistic resistant article of claim 8 wherein the sheets are individually consolidated.

15. The ballistic resistant article of claim 8 wherein the stack of sheets is consolidated as a whole.

* * * * *